(12) United States Patent
Choi

(10) Patent No.: US 7,787,745 B2
(45) Date of Patent: Aug. 31, 2010

(54) SYSTEM FOR PLAYING DIGEST OF MOVING IMAGE AND MOBILE COMMUNICATION TERMINAL HAVING THE SAME

(75) Inventor: Bong-Weon Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 1084 days.

(21) Appl. No.: 11/485,846

(22) Filed: Jul. 12, 2006

(65) Prior Publication Data

US 2007/0071405 A1 Mar. 29, 2007

(30) Foreign Application Priority Data

Sep. 28, 2005 (KR) .................. 10-2005-0090452

(51) Int. Cl.
*H04N 5/93* (2006.01)
(52) U.S. Cl. .......................................... 386/52; 386/55
(58) Field of Classification Search .................. 386/52, 386/55, 46, 68, 67, 69
See application file for complete search history.

(56) References Cited

U.S. PATENT DOCUMENTS 5,457,669 A   10/1995  Kim et al.
5,761,369 A *  6/1998  Yoshimura et al. ............. 386/46
2001/0002223 A1  5/2001  Watanabe
2005/0086703 A1  4/2005  Gupta et al.
2005/0216443 A1 *  9/2005  Morton et al. .................. 707/3

FOREIGN PATENT DOCUMENTS

| EP | 1174879 | 1/2002 |
|---|---|---|
| EP | 1182584 | 2/2002 |
| EP | 1293982 | 3/2003 |
| EP | 1531474 | 5/2005 |
| KR | 2002-0074328 | 9/2002 |
| KR | 2003-0056546 | 7/2003 |
| WO | WO 2004/090898 | 10/2004 |
| WO | WO 2005/001838 | 1/2005 |

* cited by examiner

Primary Examiner—Robert Chevalier
(74) Attorney, Agent, or Firm—H.C. Park & Associates, PLC

(57) ABSTRACT

A system for playing a digest of a moving image file is provided, including: a header parsing part that parses a header of the moving image file and acquires information concerning the playback length M and random access point of the moving image file; a section dividing part that divides the playback length M by the number N of equal sections and determines a starting point S(i) of each of the sections; a correction part that corrects the starting point S(i) to a closest random access point R(i) of the moving image file; and a digest playback part that determines a playback segment P(i) of each of the sections which corresponds to a distance extended from the closest random access point R(i) by a playback length L, and sequentially plays the playback segments P(i).

18 Claims, 6 Drawing Sheets

SYSTEM FOR PLAYING DIGEST OF MOVING IMAGE AND MOBILE COMMUNICATION TERMINAL HAVING THE SAME

This application claims the priority of Korean Patent Application No. 2005-90452, filed on Sep. 28, 2005, in the Korean Intellectual Property Office, the disclosure of which is incorporated herein in its entirety by reference.

BACKGROUND OF THE INVENTION

1. Field of the Invention

The present invention relates to a system for playing a digest of a moving image using a random access method and a mobile communication terminal having the same.

2. Description of Related Art

In general, a user needs to press a fast forward or rewind button in a moving image player to roughly understand the content of a moving image with a large file size before viewing the moving image.

However, there is a problem in that since a portable device such as a mobile communication terminal has limitations in terms of CPU capability, memory capacity, and user interface (UI), it takes a lot of time to buffer the moving image.

In order to overcome the above-mentioned problem, a single still image extracted from the moving image is provided in thumbnail mode to the user before the moving image is played.

However, in this case, there is a problem in that it is very difficult for the user to understand the content of the moving image from the single still image.

In order to overcome the above-mentioned problem, there has been proposed a technique of extracting image frames from a moving image and playing the image frames so that a user can understand the content of the moving image before the moving image is played.

SUMMARY OF THE INVENTION

The present invention provides a system for playing a digest of a moving image, which allows a user to rapidly understand the content of the moving image in a device having limitations in terms of CPU capability, memory capacity, and user interface (UI).

According to an aspect of the present invention, there is provided a system for playing a digest of a moving image file, including: a header parsing part that parses a header of the moving image file and acquires information concerning the playback length M and random access point of the moving image file; a section dividing part that divides the playback length M by the number N of equal sections and determines a starting point S(i) of each of the sections; a correction part that corrects the starting point S(i) to a closest random access point R(i) of the moving image file; and a digest playback part that determines a playback segment P(i) of each of the sections which corresponds to a distance extended from the closest random access point R(i) by a playback length L, and sequentially plays the playback segments P(i).

The digest playback part may further insert and play a boundary image between playback segments P(i) of two adjacent sections to inform a user that the digest of the moving image file is not continuously played.

The boundary image may be an image having a fade-in and/or fade-out effect.

The boundary image may be an image having a sound effect (volume-up and/or volume-down).

The moving image file may be encoded in MPEG (Moving Picture Experts Group) format.

The random access point may be a position of I-frame (Intra-coded frame) coded independently of all other frames.

The system may further include a setup part that sets the number N of the sections and the playback length L.

The playback length L may be shorter than a length obtained by dividing the playback length M of the moving image file by the number N of sections.

According to another aspect of the present invention, there is provided a mobile communication terminal equipped with the system for playing a digest of a moving image file.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
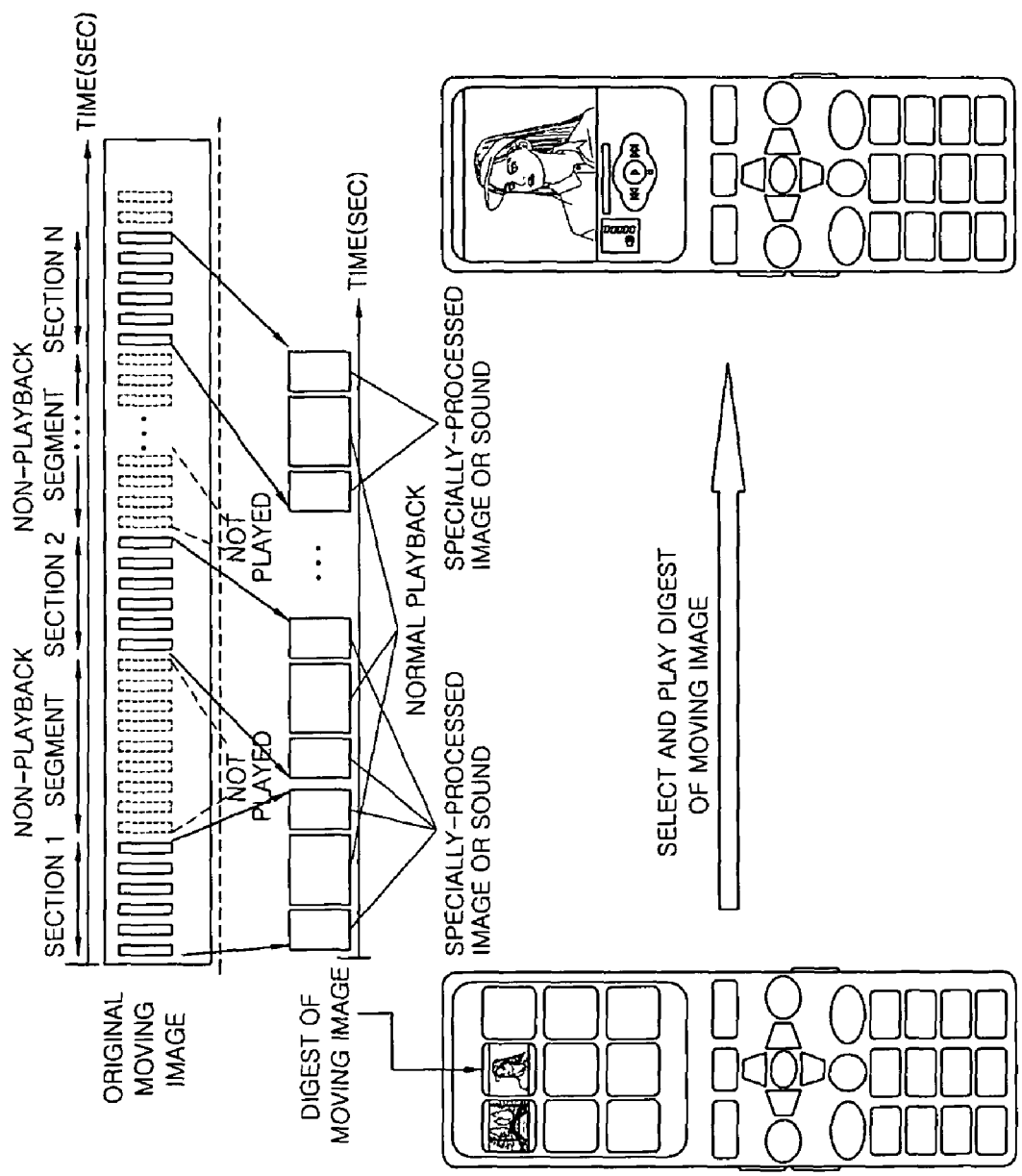
FIG. 1 is a view of explaining a system for playing a digest of a moving image according to the present invention.

FIG. 1 is a view of explaining a system for playing a digest of a moving image according to the present invention.

A system for playing a digest of a moving image according to an embodiment of the present invention is directed to allowing a user to readily understand the content of the moving image prior to playing the moving image. The system is operated in a software form particularly in an apparatus such as a mobile communication terminal that has limitations in terms of CPU capability, memory capacity, and user interface (UI).

The system is configured to divide a moving image into a plurality of sections, to correct a starting point of each of the sections to a closest random access point, and to sequentially play a playback segment in each of the sections, which corresponds to a predetermined length of moving image from the closest random access point in each of the sections.

In addition, the system is configured to insert and play a specially-processed image or sound between the playback segments in the respective sections to notify a user that the images are not continuously played between the respective sections.

That is, when a digest of a moving image with a large file size is provided to a user before the moving image is played, the user can view the digest of the moving image to rapidly understand the content of the moving image before the moving image is played.

Figure 2:
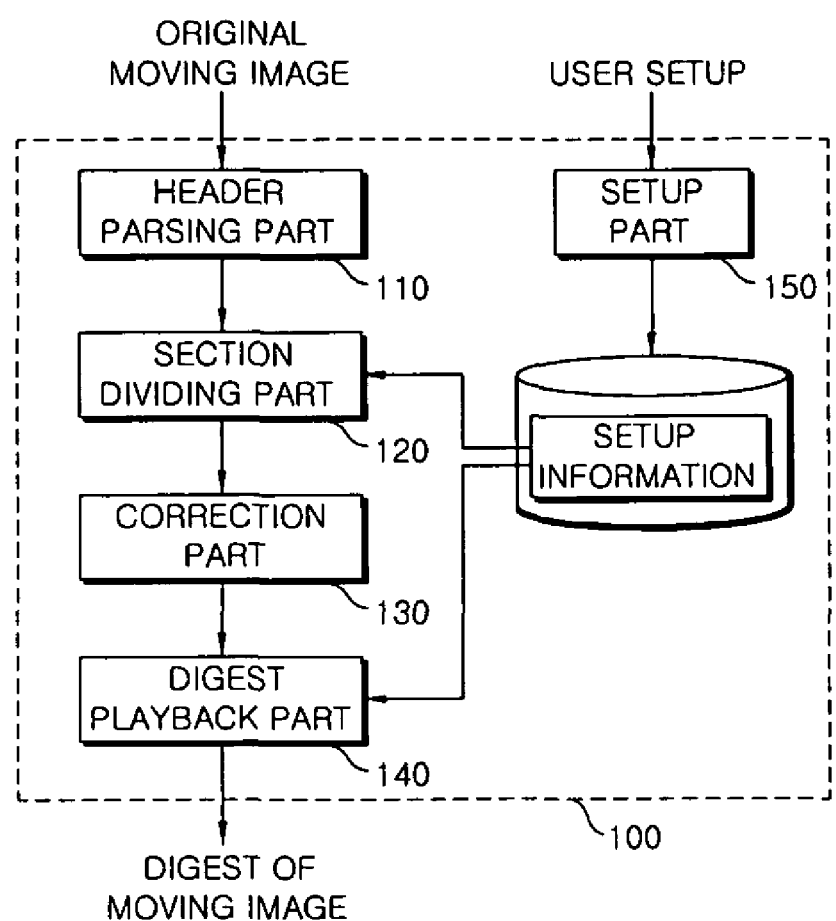
FIG. 2 is a block diagram of a system for playing a digest of a moving image according to an embodiment of the present invention.

FIG. 2 is a block diagram of a system for playing a digest of a moving image according to an embodiment of the present invention.

The system 100 includes a header parsing part 110, a section dividing part 120, a correction part 130, and a digest playback part 140.

The header parsing part 110 parses a header of a moving image file to be played and acquires information concerning the playback length M and random access point of the moving image file.

In general, a header of a moving image file encoded in MPEG-2, MPEG-4, or H.264 format allowing random access includes information required for decoding or playing the moving image file. For example, the information includes the playback length of the moving image file, a random access point of a frame coded independently of all other frames, and the like.

The system 100 extracts information concerning the playback length M and random access point of the moving image file from the header of the moving image file by means of the header parsing part 110.

The section dividing part 120 divides the playback length M of the moving image file by a predetermined number N of sections, and determines a starting point S(i) of each of the sections. The starting point S(i) of each of the sections is determined by a specific function. A process of determining the number N of the sections will be described in detail.

Figure 3:
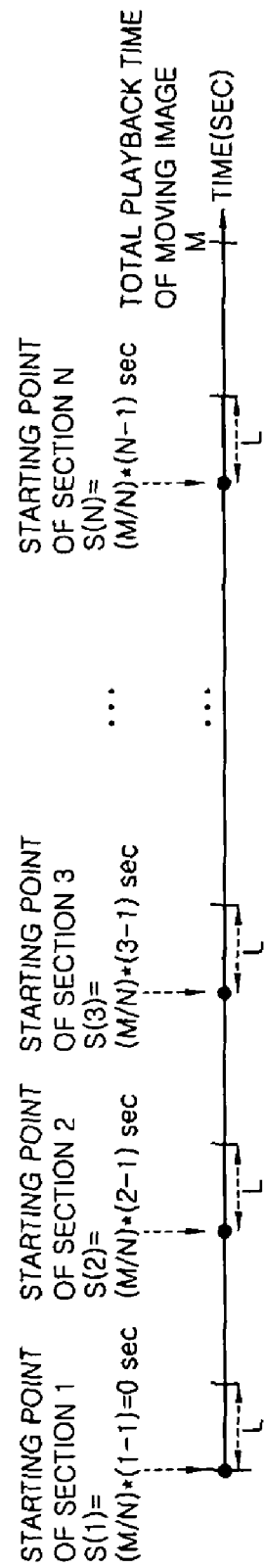
FIG. 3 illustrates a playback range of a moving image file divided into N equal sections by the section dividing part.

FIG. 3 illustrates the playback range M of a moving image file divided into N equal sections by the section dividing part 120. The starting point S(i) of each of the sections is determined by a function $(M/N)*(i-1)$, where the variable 'i' indicates the order of the sections. That is, the starting point of each of the sections is determined by the equation $S(i)=(M/N)*(i-1)$.

The correction part 130 corrects the starting point of each of the sections determined by the section dividing part 120 to a closest random access point R(i) of the moving image file.

There is little difference in image between adjacent image frames in the moving image file encoded in MPEG-2, MPEG-4, or H.264 format allowing random access. Thus, I-frame (Intra-coded frame), which is coded independently of all other frames, P-frame (Predictively coded frame), which is coded based on previously coded frame, and B-frames (Bidirectionally predicted frame), which is coded based on both previous and future coded frames, are arranged in a predetermined pattern. In the moving image file encoded in MPEG-2, MPEG-4, or H.264 format, a position of the I-frame becomes a position of a random access point.

However, since the starting point S(i) of each of the sections determined by the section dividing part 120 does not match with the random access point, the starting point S(i) of each of the sections needs to be corrected to a closest random access point R(i).

Figure 4:
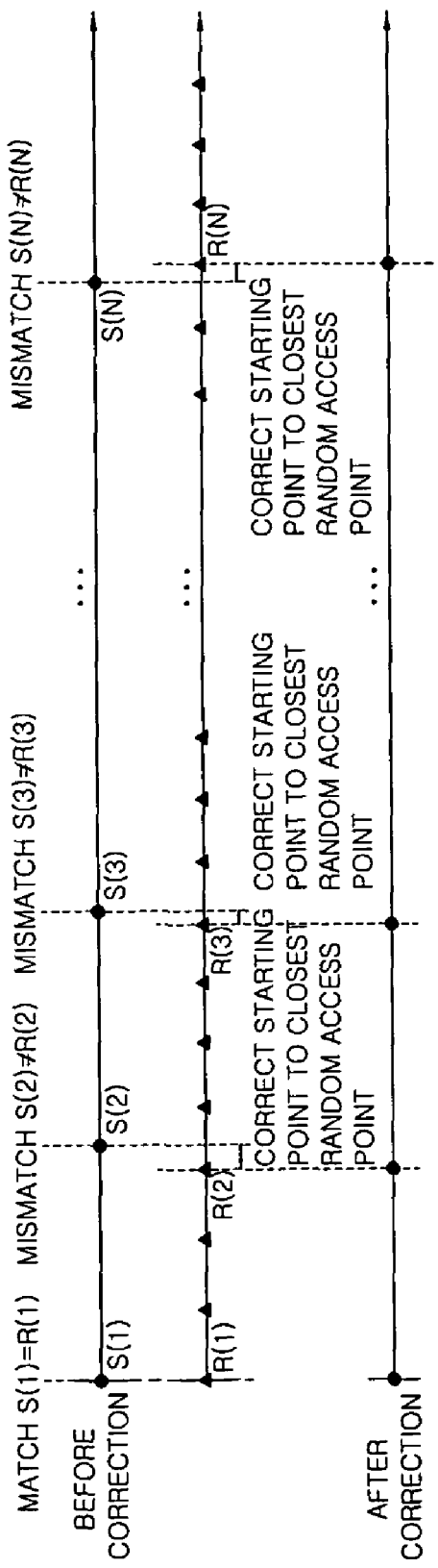
FIG. 4 illustrates a starting point of each of sections that is corrected to a closest random access point by means of a correction part of a system for playing a digest of a moving image according to an embodiment of the present invention.

As shown in FIG. 4, the system 100 corrects a starting point S(i) of each of the sections to a closest random access point R(i) of a moving image file by means of the correction part 130. FIG. 4 illustrates a starting point of each of the sections that is corrected to a closest random access point by means of the correction part 130 of the system 100.

The digest playback part 140 determines a playback segment P(i) of each of the sections that corresponds to a playback length L from the closest random access points R(i) corrected by the correction part 130, and sequentially plays the playback segment P(i) in each of the sections.

Meanwhile, the system 100 according to the present invention selects and sequentially plays part of the entire playback range of the moving image file to play a digest of the moving image, such that a user can rapidly understand the content of the moving image before the moving image is played.

Figure 5:
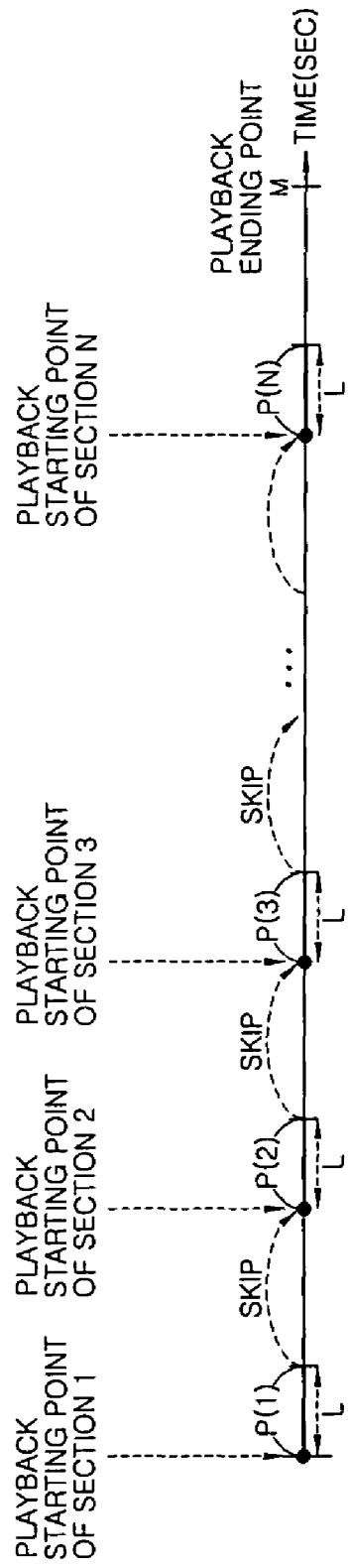
FIG. 5 illustrates a playback segment in each of sections that is played by a digest playback part of a system for playing a digest of a moving image according to an embodiment of the present invention.

For this purpose, as shown in FIG. 5, the system 100 determines by means of the digest playback part 140 a playback segment P(i) in each of the sections that corresponds to a predetermined playback length L from each of the closest random access points R(i) corrected by the correction part 130. FIG. 5 illustrates a playback segment in each of the sections that is played by the digest playback part of the system 100 according to the present invention.

The playback length L is less than the entire playback length of each of the sections (i.e., a length obtained by dividing the playback length M of the moving image file by the number N of sections). The playback length L is preferably very short compared to the playback length of each of the sections to increase the playback efficiency.

When the playback segment P(i) of each of the sections is determined, the system 100 sequentially plays the playback segment P(i) of each of the sections by means of the digest playback part 140, thereby playing a digest of the moving image. Accordingly, a user can view the digest of the moving image and rapidly understand the content of the moving image before the moving image is played.

According to another embodiment of the present invention, the digest playback part 140 of the system 100 may further insert and play a boundary image between the playback segments P(i) of the respective sections to inform a user that the moving image is not continuously played.

The boundary image may be an image having a fade-in and/or fade-out effect.

The boundary image may be an image having a sound effect (volume-up and/or volume-down).

In addition, the boundary image may be one of or a combination of images having various special effects to inform a user that a moving image is not continuously played.

That is, the system 100 according to an embodiment of the present invention is configured to insert and play a boundary image having a special effect, such as a fade-in and/or fade-out effect or a sound effect, between playback segments of the respective sections to inform a user that a digest of the moving image consists of discontinuous moving images extracted from the respective sections of an original moving image.

According to another embodiment of the present invention, the system 100 may further include a setup part 150.

The setup part 150 sets the number N of sections and the playback length L, and provides user interface (UI) to allow a user to input setup values for the number N of sections and the playback length L.

That is, the system 100 configured in this manner allows the user to determine the size of a digest of a moving image by setting the number N of sections and the playback length L.

Figure 6:
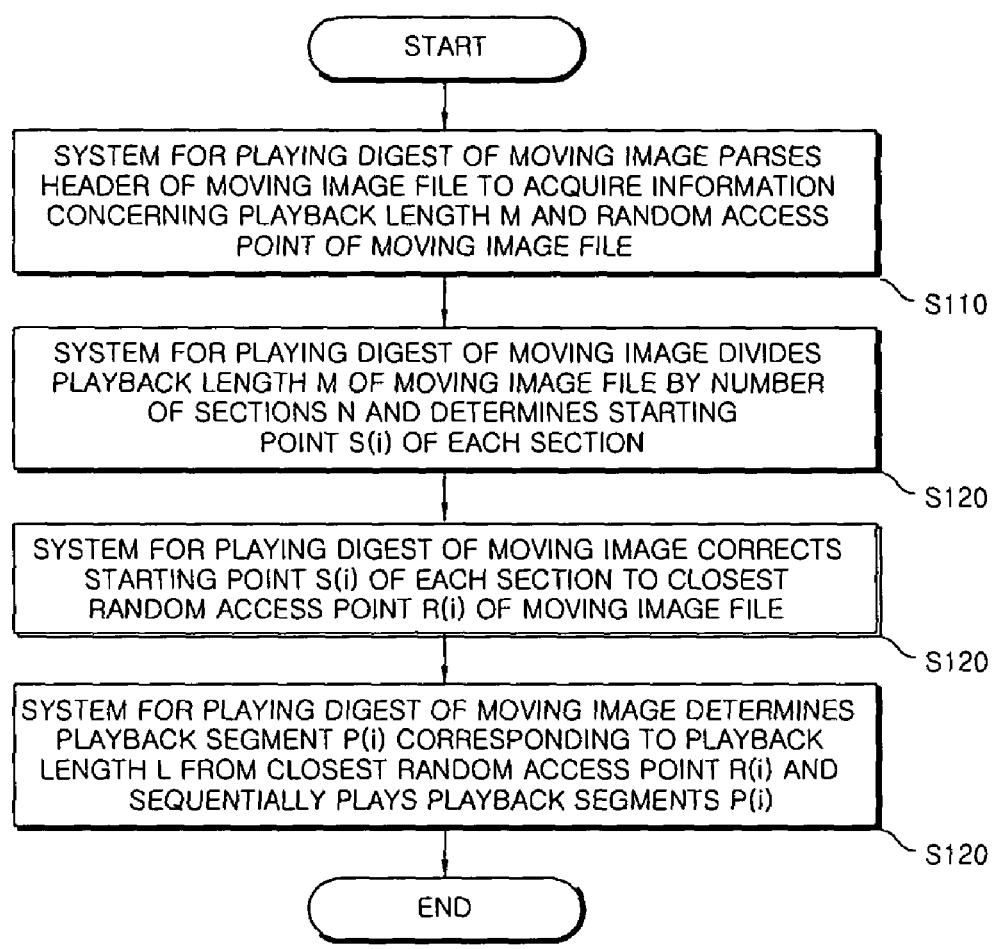
FIG. 6 is a flow chart of playing a digest of a moving image file in a system for playing a digest of a moving image file according to an embodiment of the present invention.

FIG. 6 is a flow chart of playing a digest of a moving image file, for example, MPEG-4 file, in a system for playing the digest of a moving image file according to an embodiment of the present invention.

In operation S110, the system 100 parses a header of a moving image file, i.e., MPEG-4 file, stored in a flash memory of a mobile communication terminal to acquire information concerning the playback length M and random access point of the moving image file.

In operation S120, the system 100 divides the playback length M of the moving image file, MPEG-4 file, acquired in the operation S110 by the number N of sections to divide the MPEG-4 file into N equal sections, and determines a starting point S(i)=(M/N)*(i−1) of each of the sections.

In operation S130, the system 100 corrects a starting point S(i) of each of the sections determined in the operation S120 to a closest random access point R(i) of the MPEG-4 file, i.e., a position of I-frame which is closest to the starting point S(i) of each of the sections.

In operation S140, the system 100 determines a playback segment P(i) of each of the sections, which corresponds to a playback length L extended from each of the closest random access points R(i), and sequentially plays the playback segments P(i) of the respective sections, such that the digest of the moving image is played before the moving image is played.

Meanwhile, when the system 100 sequentially plays the respective playback segments P(i) in the operation S140, a special effect image or sound, such as an image having a fade-in and/or fade-out effect or a sound effect (volume-up and/or volume-down), for representing a boundary image may be inserted and played to inform a user that the digest of the moving image consists of discontinuous moving images extracted from the respective sections of an original moving image.

As apparent from the above description, a system for playing a digest of a moving image according to the present invention divides the moving image into equal sections, corrects a starting point of each of the sections to a closest random access point, and sequentially plays a playback segment of each of the sections that corresponds to a playback length extended from each of the closest random access points, such that a user can understand the content of the moving image rapidly and conveniently in an apparatus that has limitations in terms of CPU capability, memory capacity, and user interface.

In addition, in the present invention, various special effect images or sounds may be inserted and played between playback segments of two adjacent sections to prevent the user from being confused by discontinuous moving images when scenes are changed.

While the present invention has been described with reference to exemplary embodiments thereof, it will be understood by those skilled in the art that various changes in form and details may be made therein without departing from the scope of the present invention as defined by the following claims.

What is claimed is:

1. A system for playing a digest of a moving image file, comprising:
    a header parsing part that parses a header of the moving image file and acquires information concerning the playback length M and random access point of the moving image file;
    a section dividing part that divides the playback length M by the number N of equal sections and determines a starting point S(i) of each of the sections;
    a correction part that corrects the starting point S(i) to a closest random access point R(i) of the moving image file; and
    a digest playback part that determines a playback segment P(i) of each of the sections which corresponds to a distance extended from the closest random access point R(i) by a playback length L, and sequentially plays the playback segments P(i).

2. The system of claim 1, wherein the digest playback part further inserts and plays a boundary image between playback segments P(i) of two adjacent sections to inform a user that the digest of the moving image file is not continuously played.

3. The system of claim 2, wherein the boundary image is an image having a fade-in and/or fade-out effect.

4. The system of claim 2, wherein the boundary image is an image having a sound effect (volume-up and/or volume-down).

5. The system of claim 3, wherein the boundary image is an image having a sound effect (volume-up and/or volume-down).

6. The system of claim 1, wherein the moving image file is encoded in MPEG (Moving Picture Experts Group) format.

7. The system of claim 2, wherein the moving image file is encoded in MPEG format.

8. The system of claim 3, wherein the moving image file is encoded in MPEG format.

9. The system of claim 6, wherein the random access point is a position of I-frame (Intra-coded frame) coded independently of all other frames.

10. The system of claim 7, wherein the random access point is a position of I-frame coded independently of all other frames.

11. The system of claim 8, wherein the random access point is a position of I-frame coded independently of all other frames.

12. The system of claim 1, further including a setup part that sets the number N of the sections and the playback length L.

13. The system of claim 2, further including a setup part that sets the number N of the sections and the playback length L.

14. The system of claim 3, further including a setup part that sets the number N of the sections and the playback length L.

15. The system of claim 12, wherein the playback length L is shorter than a length obtained by dividing the playback length M of the moving image file by the number N of sections.

16. The system of claim 13, wherein the playback length L is shorter than a length obtained by dividing the playback length M of the moving image file by the number N of sections.

17. The system of claim 14, wherein the playback length L is shorter than a length obtained by dividing the playback length M of the moving image file by the number N of sections.

18. A mobile communication terminal equipped with the system of claim 1.

* * * * *